Jan. 28, 1958     W. H. KAGLEY ET AL     2,821,227
SIDE DELIVERY FRUIT AND PIT SEPARATING
CHUTE FOR FRUIT PITTING MACHINE
Filed Oct. 17, 1955                         2 Sheets-Sheet 1

WILLIAM HERBERT KAGLEY
BENTLEY J. MILAM
INVENTORS.
Huebner, Beehler, Worrel & Herzig
BY

ATTORNEYS.

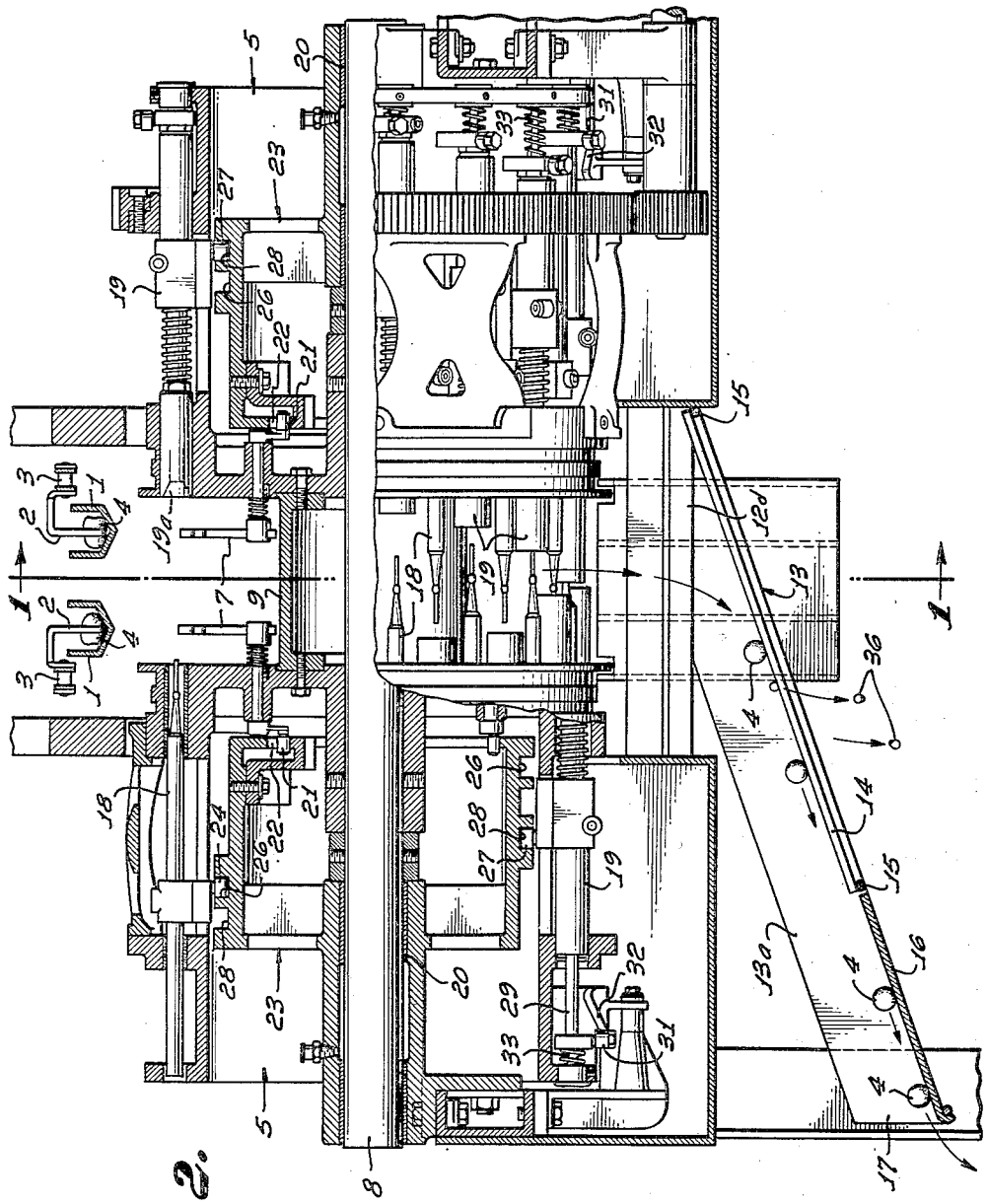

United States Patent Office 2,821,227
Patented Jan. 28, 1958

2,821,227

SIDE DELIVERY FRUIT AND PIT SEPARATING CHUTE FOR FRUIT PITTING MACHINE

William Herbert Kagley, Lindsay, and Bentley J. Milam, Strathmore, Calif., assignors to Lindsay Ripe Olive Company, Lindsay, Calif., a corporation of California Application October 17, 1955, Serial No. 540,746

2 Claims. (Cl. 146—27)

The present invention relates to a machine for pitting fruit, such as olives, and in particular to improvements over certain features of the invention described and claimed in United States Patent of Edward P. Drake, Fred J. Alberty, and William H. Kagley, No. 2,341,857, granted February 15, 1944, for Fruit Pitting Machine.

In removing pits from olives by a machine of the type identified above, the olives are individually grasped in a predetermined, aligned position while a punch enters from one end of the olive and is forced longitudinally therethrough. During this operation, the olive is forced against a die by the punch. The olive pit is pushed out through the end of the olive by the punch into a bore passing through the die.

From time to time, through mal-function, two olives, instead of one, may be released by the feeding mechanism of the machine to the aligning mechanism. Inasmuch as only one of the olives can be grasped and aligned for the pitting operation, the other olive is dropped from the end of the feeding mechanism and gravitates, sometimes with stray olive pits, to the floor or to a hopper, or other receptacle, such as one for olive pits, and is wasted or converted into less profitable by-products unless recovered at an expense exceeding its value. During prolonged periods of continuous operation, a considerable number of olives may be lost or misplaced in this manner.

Accordingly, an important object of the invention is to provide an apparatus of efficient design for conveniently and continuously separating and recovering, without contamination, any unpitted fruit, free of pits inadvertently dropped from such a machine, so that the unpitted fruit can be efficiently collected and again fed to the machine for pitting thereof.

Another object is to provide in the proper location a special chute for receiving therein and passing therethrough the unpitted olives dropped by the machine, and separating any pits accidentally dropped with the unpitted olives, so as to recover the unpitted olives separately from olive pits and continuously deliver the olives to a receptacle adjacent the olive pitting machine for re-feeding to the aligning and pitting mechanism of the machine.

Other objects and advantages will appear from the further description in the specification and the illustration in the drawings.

In the drawings:

Figure 2 is a cross-sectional view taken on the line 2—2 of Figure 1, generally similar to Figure 26 in the patent referred to above, showing the side delivery chute leading from the lower central portion of the machine.

Figure 1:
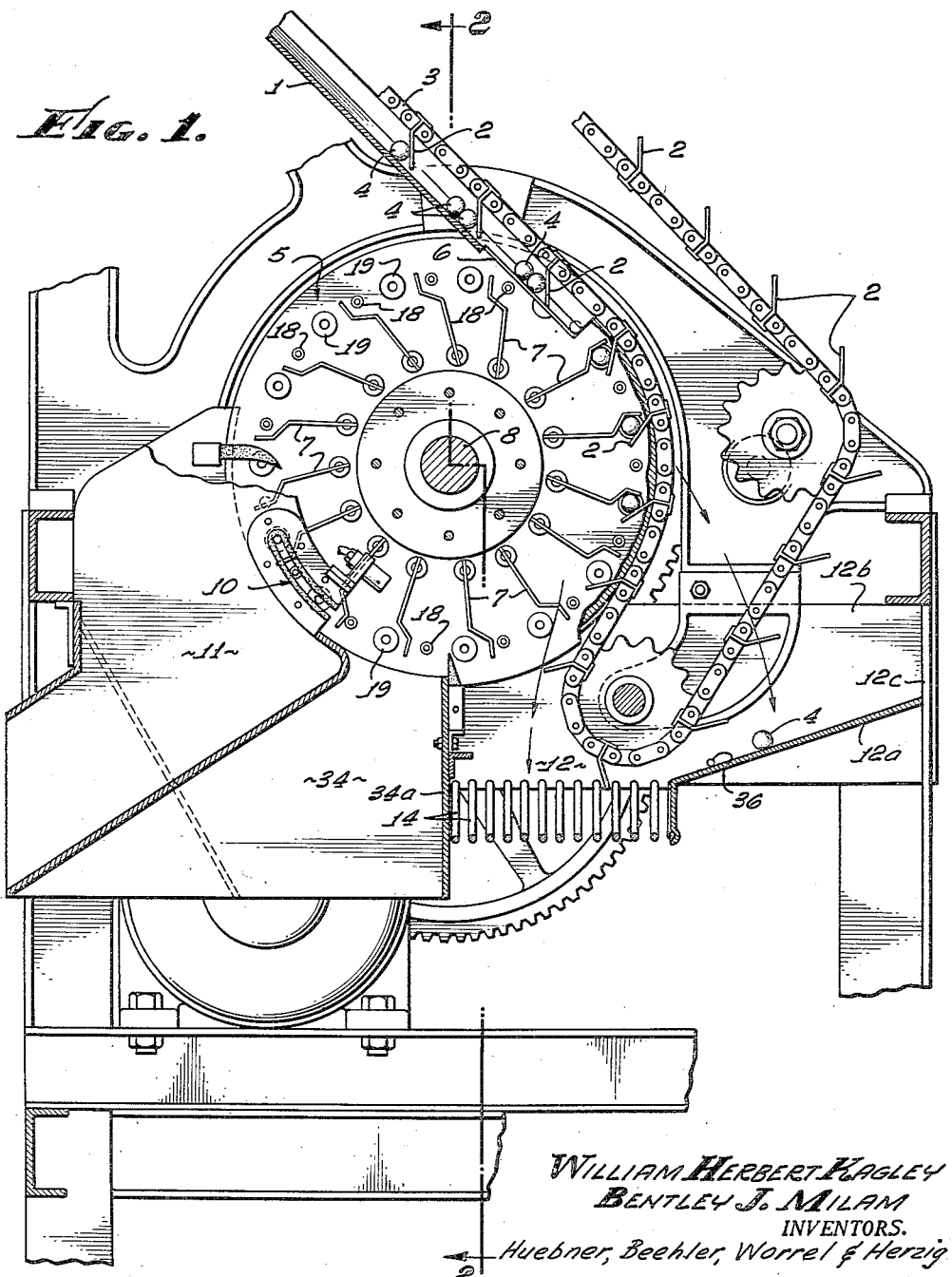
Figure 1 is a vertical cross-sectional view of the olive pitting machine taken on the line 1—1 of Figure 2, and borrowed in general from Figure 27 in the patent referred to above, showing a portion of a grate on the upper end of our novel side delivery chute.

In the fruit pitting machine described in the patent to which reference was made above, fruit, such as olives, is fed continuously to olive feeding chute means indicated herein at 1. Spacer or gripper members 2 are fastened to links of an endless chain 3 in spaced relationship, such as to every third link, and initially serve to space the individual olives 4 as they roll or slide downward in chute 1 toward revolving drums 5. Two such drums are mounted in axially spaced relationship, as shown in Figure 2.

As the olives 4 pass through chute 1, they seek their most natural rolling position. This position is rapidly assumed no matter what the position of each olive as it is fed into the chute. The olive invariably assumes a position with its longitudinal axis transverse of the chute 1 as it approaches drums 5.

A slot 6, cut through the bottom of chute 1 for a distance near its lower end, is not wide enough to affect the movement or position of the olives 4 but permits each of the narrow gripper fingers 7 to enter behind each of the spaced, aligned olives and close in upon the same to grip the olive 4 between a gripper finger 7 and a spacer member 2, as shown. When by mal-function two olives are fed together, as illustrated in Figure 1, instead of single spaced olives, only one of the two is gripped and the other one is dropped.

The endless chain 3 follows for a distance the contour of drums 5, which form part of the punch and die mechanism. Views of the punches 18 and dies 19 are shown in Figure 2.

The gripper finger 7 and the spacer member 2, while gripping an olive 4 between them, travel together in olive gripping relationship in a circular path with rotating drums 5 approximately to the position where the olive is seized by the punch 18 and die 19, whereupon the spacer member 2 takes off tangentially and returns cyclically through an endless path. Each gripper finger 7 is retracted by a cam follower 21 acting in a cam raceway 22 formed in the inner end of a cam barrel 23, and returns cyclically with the continuous rotation of each drum 5.

The punches 18 and dies 19 are mounted circumferentially in spaced relationship with respect to each other on each of the two drums 5. Furthermore, the punches and dies are arranged on the peripheral regions of the drums in alternating relationship. The drums, in turn, are mounted in axially spaced relationship with respect to each other on main shaft 8 so that the punches on one drum are positioned axially opposite the dies on the other drum, and the dies on the first mentioned drum are axially opposite the punches on the second mentioned drum. This is accomplished by orienting and rigidly connecting the two axially spaced drums at their inner ends by a central member 9 so that they rotate together as a unit with shaft 8. Shaft 8 is rotatably mounted in bearing 20 fastened to the frame of the machine, as indicated in Figure 2. The cam barrels 23 are fixedly mounted and as each drum 5 is fixed to the main shaft 8, the drums rotate concentrically around the cam barrels.

During the continuous cyclic operation of the fruit pitting machine, the punch 18 under the control of a cam follower 24, in a cam raceway 26 formed on the periphery of a cam barrel 23, enters an olive 4 from one end and, at a later stage is forced longitudinally therethrough. The punch forces the olive against the countersunk surface of an olive receiving cup 19a on the inner end of a die 19.

During the pitting operation the die 19 is advanced toward its aligned punch 18, and later retracted under the control of a cam follower 27, in a cam raceway 28 also formed on the periphery of a cam barrel 23. A coring tool 29 (Figure 2) is slidable within the die 19 and has a knife on its inner end (not shown) with which it makes a circular incision in the end of the olive while the coring tool is extended by the action of cam follower 27 in cam raceway 28. After the incision is made, the coring tool 29 is retracted by the action of cam follower 31 against auxiliary cam 32, and the punch 18 is forced through the olive. The olive pit is pushed out through the end of the olive, while the olive is supported by the cup at the inner end of the die, into a longitudinal central bore passing through the die.

Later the olive pit is expelled from the front end of the bore by the forward movement in the die of a rod 33. The expelled olive pit is dropped into a pit receiving hopper 34 for olive pits as the punch and die pass over the mouth of the hopper. The resulting pitted olive is withdrawn from the cup on the inner end of a die 19 while impaled on the tip of a punch 18. The impaled olive then is carried to an arcuately slotted olive stripper 10. The punches carrying the pitted olives enter the slot of member 10, and continue to retract after so entering, so that the impaled olives are stripped from the punches by the edges of the slot. The slot is open at its forward end to permit the punch to enter transversely and is sufficiently narrow to restrain olives upon retraction of the punch. The pitted olives drop from the punches into a fruit receiving hopper 11, having an inclined bottom which leads down to a discharge opening above a receptacle for pitted olives.

Instead of the normal desired operation described above, however, two olives 4, as indicated in Figure 1, are sometimes released by the feeding mechanism of the machine to chute 1, spacer member 2 and gripper finger 7. Inasmuch as the members 2 and 7 can grasp only one olive at a time, at least one of the olives 4 rolls off the end of chute 1 and falls by gravity, in a region generally indicated by the arrows in Figure 1. For this contingency, we have provided an auxiliary hopper 12 which has an inclined bottom portion 12a and side walls 12b causing the unpitted olives to roll or gravitate to the upper end of novel side delivery chute 13. Some olive pits 36 also drop into the hopper 12 with the unpitted olives 4 by devious means as by sticking to rotating members such as punches 18, dies 19, connecting member 9, etc., or by bouncing around in the machine because of the centrifugal force imparted to the pits, or because the pits slip from dies 19 before reaching the mouth of hopper 34.

The hopper 12 has a horizontal receiving area extending from the wall 34a of the pit hopper to a position 12c outside the vertical plane of the chain 3 (see Figure 1), and is wide enough to take in the space between the drums (see Figure 2).

The chute 13 extends preferably at a right angle to the hopper 12, and with its upper end occupying the bottom opening 12d of the hopper. It may extend somewhat above and beyond on the upper end, and does extend considerably below and beyond on the lower end. Thus the chute receives whatever olives and pits fall into the hopper 12.

The chute 13 is formed with sides 13a, and the upper bottom portion of the chute comprises a grate formed of parallel rods 14 running longitudinally in the plane of the lower imperforate bottom section 16 of the chute. The rods 14 preferably are supported at their opposite ends by transverse rods 15. Rods 14 may, however, be supported by other convenient means. These rods are spaced apart a distance greater than the largest diameter of the oval-shaped olive pits but less than the smallest diameter of the oval-shaped unpitted olives 4, and would be spaced to similarly relate to any other fruit which the machine might be designed to handle. The olives and pits are caused to roll by gravity over the parallel rods 14. In so rolling, the pits fall between adjacent rods of the grate and drop into any receptacle intended for pits. The olives, on the other hand, continue to roll the full length of the rods 14.

After passing over the lower ends of the rods 14, the olives 4 roll over the bottom 16 at the lower end of the chute 13 to a discharge opening 17. From the discharge opening, they are directed into boxes or other receptacles for the unpitted olives. The thus separated and recovered olives are recharged to the feeding mechanism of the fruit pitting machine. In this manner, a considerable number of olives is saved efficiently and automatically without interfering with the continuous operation of the machine.

By way of illustration, and not of limitation, the chute 13 preferably is inclined at a minimum angle to the horizontal of about 17° so that the olives will roll by gravity freely downward over the bottom of the chute, as indicated by arrows in Figure 2. It has been found that a minimum angle of about 17° ordinarily is desirable for this purpose. When the angle is made appreciably less than this value, there may be insufficient inclination for the olives to roll freely under the force of gravity. On the other hand, when the angle is made much greater than 17°, the olives together with the pits may tend to bounce over the chute or move too rapidly through the chute for the pits to be efficiently separated from the olives. In the case of other fruit, the angle may have to be varied.

It may be noted that the rotary path of the punches and dies includes an initial or first portion which is limited in a vertical sense to an area between the wall 34a and the position 12c generally occupied by the auxiliary hopper 12. The second portion of the rotary path is in general vertical alignment with the upper end opening of the pit receiving hopper 34, and the third portion of the path is in general vertical alignment with the upper end opening of the fruit receiving hopper 11.

While olives have been mentioned in describing the invention, the machine may be employed for pitting other fruit, as for one example, cherries, and the relationship of the spacing of the rods 14 (or other type of openings) in the side delivery chute or inclined bed 13 will be determined by the relative size of pit and whole fruit for which the machine may be constructed.

While the instant invention has been shown and described herein in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

What we claim as our invention is:

1. A fruit pitting machine comprising axially aligned punches and dies relatively reciprocating axially while traveling in a rotary path transversely of said axes, a fruit feeding and gripping mechanism operating to grip and carry single pieces of fruit through an initial portion of said path, said mechanism including a feed chute terminating in the initial portion of said path, a pit ejecting action being performed by said punches and dies while traveling in a second portion of said path, and means for stripping pitted fruit from the punches in a third portion of said path, said machine being provided with separate and independent receiving compartments vertically below each of said portions, the compartment below the initial portion including an inclined bed with openings therein larger than a fruit pit and small enough to collect and separate stray pits and fruit.

2. A machine as defined in claim 1 wherein said inclined bed slopes at an angle of approximately 17° from the horizontal.

References Cited in the file of this patent

UNITED STATES PATENTS

| | | |
|---|---|---|
| 457,940 | Stevenson | Aug. 18, 1891 |
| 1,089,034 | Baker | Mar. 3, 1914 |
| 1,726,719 | Schau | Sept. 3, 1929 |
| 2,341,857 | Drake et al. | Feb. 15, 1944 |
| 2,635,662 | Doering et al. | Apr. 21, 1953 |